United States Patent [19]
Thompson

[11] Patent Number: 5,284,052
[45] Date of Patent: Feb. 8, 1994

[54] MOISTURE GAUGE

[76] Inventor: Glen F. Thompson, R.R. 1, Box 50, Cogswell, N. Dak. 58017

[21] Appl. No.: 907,506

[22] Filed: Jul. 1, 1992

[51] Int. Cl.⁵ ............................................. G01W 1/00
[52] U.S. Cl. .............................. 73/170.21; 73/170.17; 73/170.19
[58] Field of Search ............. 73/170.17, 170.18, 73/170.19, 170.21, 863.31, 61.77; 220/23.2

[56] References Cited

U.S. PATENT DOCUMENTS

| | | | |
|---|---|---|---|
| 2,381,602 | 8/1945 | Larson | 73/171 |
| 2,468,692 | 4/1949 | Stevens | 137/106 |
| 2,507,206 | 5/1950 | Hunn et al. | 73/171 |
| 2,601,783 | 7/1952 | Rouse et al. | 73/171 |
| 2,701,472 | 2/1955 | Allen et al. | 73/171 |
| 2,711,099 | 6/1955 | Hastings | 73/171 |
| 2,789,431 | 4/1957 | Wong | 73/171 |
| 2,954,690 | 10/1960 | Dickinson | 73/171 |
| 2,997,876 | 8/1961 | Butzow | 73/171 |
| 3,360,785 | 1/1968 | Christian | 73/61.77 |
| 3,535,925 | 10/1970 | Woofter | 73/171 |
| 3,540,277 | 11/1970 | Roth et al. | 73/61.77 |
| 3,705,533 | 12/1972 | Kahl et al. | 73/170.23 |
| 3,826,135 | 7/1974 | Hollmann | 73/171 |
| 4,106,336 | 8/1978 | Marley | 73/171 |
| 4,140,011 | 2/1979 | Krupa et al. | 73/170.13 X |
| 4,196,618 | 4/1980 | Patterson | 73/149 |
| 4,324,132 | 4/1982 | Williams | 73/61.77 |
| 4,418,576 | 12/1983 | White | 73/61.77 |
| 4,709,585 | 12/1987 | Altenhofen | 73/53.01 |
| 5,038,606 | 8/1991 | Geschwender et al. | 73/171 |

*Primary Examiner*—Richard E. Chilcot, Jr.
*Assistant Examiner*—Elizabeth L. Dougherty
*Attorney, Agent, or Firm*—Kinney & Lange

[57] ABSTRACT

A rain gauge for collecting and measuring precipitation and capable of measuring the amount of collected precipitation that has evaporated. The rain gauge is also capable of measuring precipitation during an interim period of time without discharging the precipitation already collected. The rain gauge comprises a collection vessel, an evaporation vessel, a collection vessel support, an evaporation vessel support and a support post. Both a non-freezing liquid and a non-evaporating liquid are placed in each of the vessels to help prevent the water contained therein from freezing and evaporating, respectively. A movable scale and marking clips are attached to the collection vessel to enable the measurement of precipitation during an interim period of time. A removable screen can be attached to both the collection vessel and the evaporation vessel and a heater can be attached to the collection vessel to melt frozen precipitation. Both vessels and vessel supports are separable so that the rain gauge can be mounted in a variety of configurations.

18 Claims, 3 Drawing Sheets

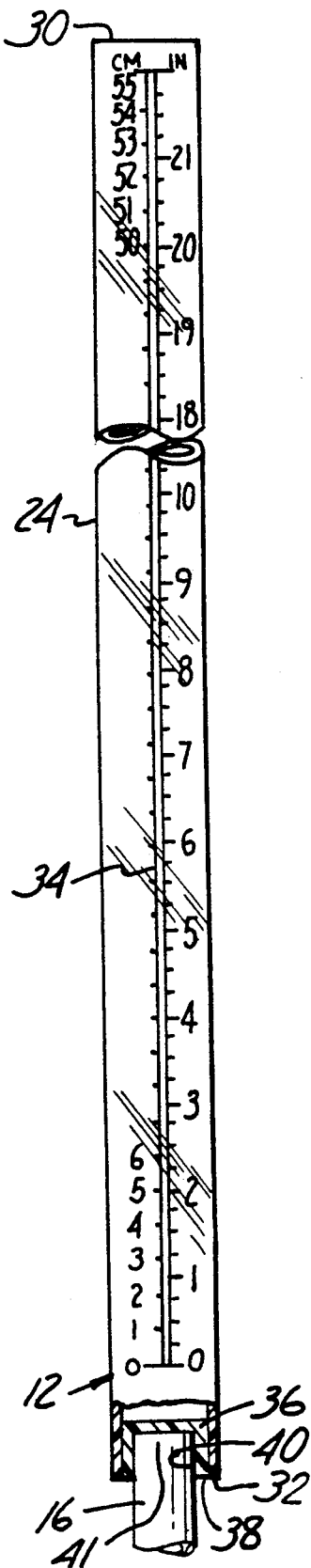
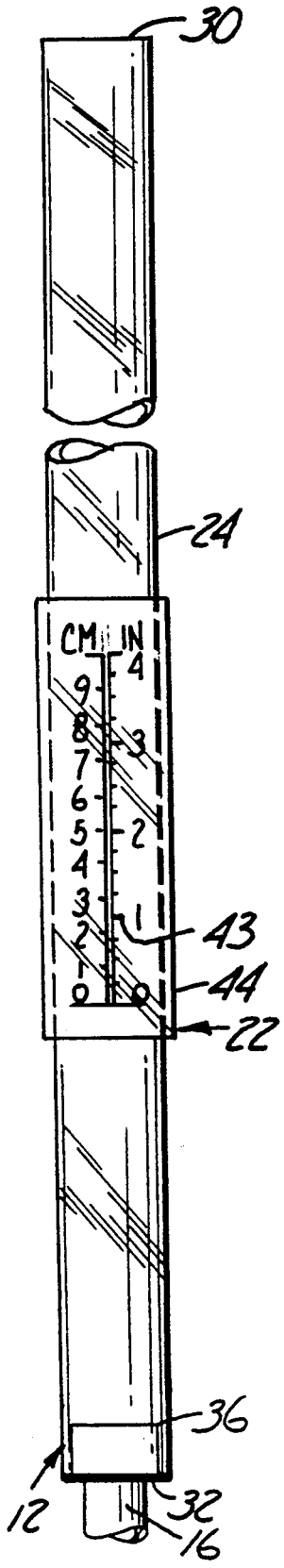
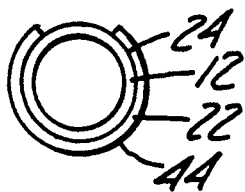

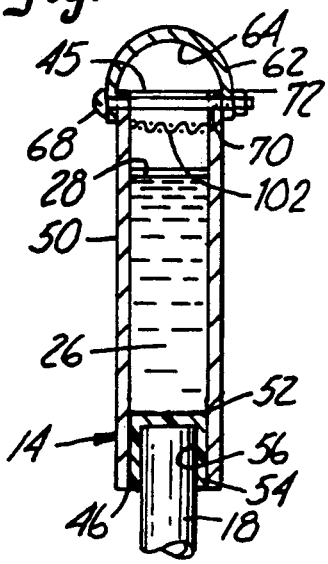
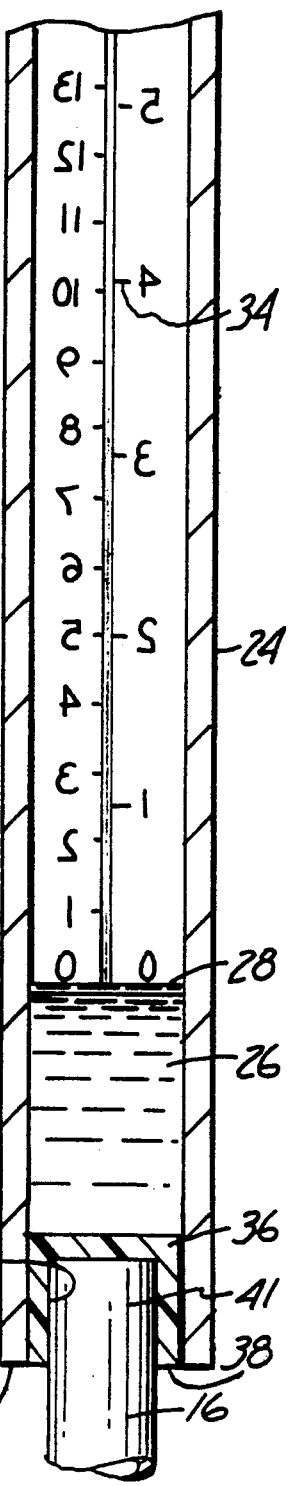
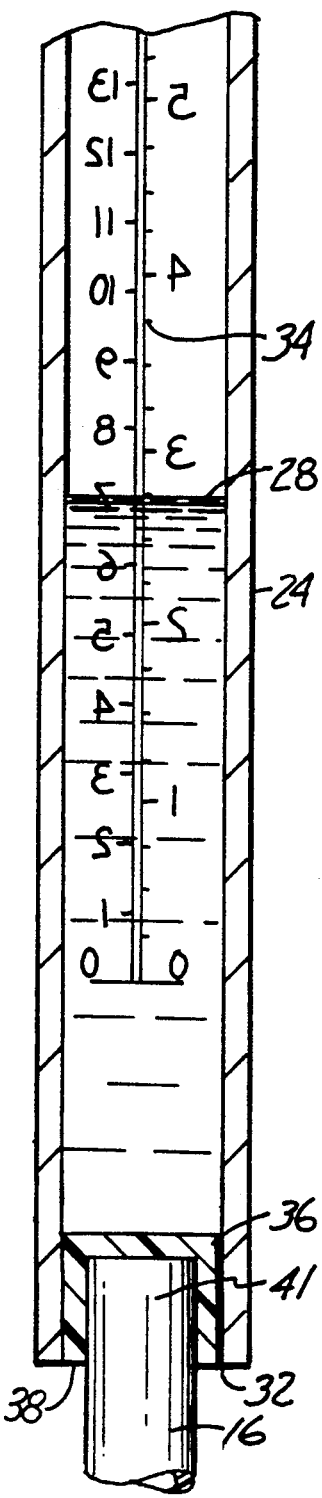
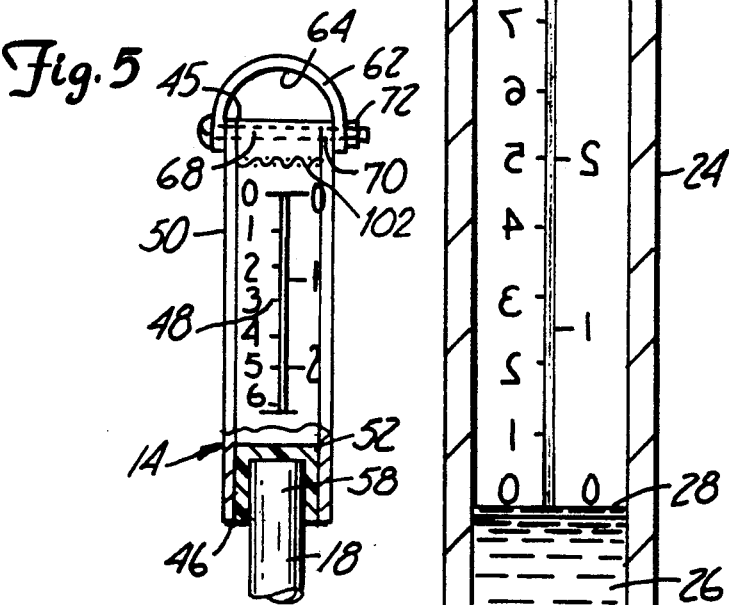
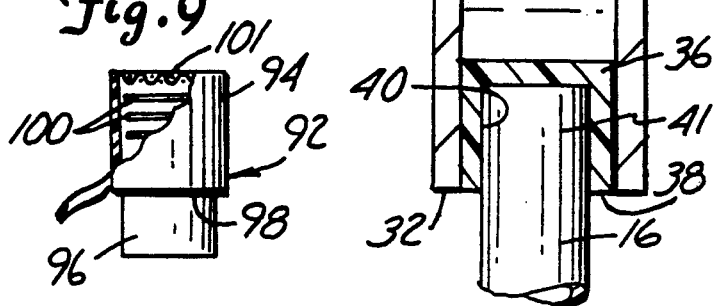

MOISTURE GAUGE

BACKGROUND OF THE INVENTION

The present invention relates to a rain gauge for collecting and measuring precipitation and, in particular, to a rain gauge that shows the amount of collected precipitation that has evaporated. The rain gauge of the present invention also allows for the measurement of precipitation during an interim period of time without discharging the precipitation already collected.

A common type of rain gauge utilizes a transparent tube to collect precipitation. The tube is usually marked on an outer surface to visually indicate the water level in the tube. A problem with such a rain gauge is that the collected precipitation may evaporate, leading to inaccurate water level readings. Therefore, some rain gauges use a non-evaporating liquid that floats on top of the collected precipitation to prevent the evaporation of the collected precipitation, as shown in Hunn U.S. Pat. No. 2,507,206.

Some non-evaporating liquids do not completely prevent the evaporation of collected precipitation. It is therefore advantageous to have a rain gauge that measures the amount of evaporation, enabling a more accurate water level reading. It is also advantageous to be able to measure the amount of precipitation that accumulates during an interim period of time without having to discharge the previously accumulated precipitation or record water levels on paper.

SUMMARY OF THE INVENTION

The present invention provides a rain gauge which enables the user to determine the amount of precipitation that falls over a given period of time. More specifically, the invention enables the user to compensate for the evaporation of collected precipitation. The present invention also enables the measurement of precipitation during interim periods of time without discharging previously collected precipitation.

The rain gauge comprises a collection vessel, an evaporation vessel, a collection vessel support on which the collection vessel is mounted, an evaporation vessel support on which the evaporation vessel is mounted and a support post for supporting both vessel supports.

Both the collection vessel and the evaporation vessel are open at a first end and each vessel has a series of horizontal markings thereon for visually indicating the quantity of water contained therein. An evaporation cover is attached to the first end of the evaporation vessel to prevent precipitation from entering the evaporation vessel.

Both the collection vessel and the evaporation vessel contain a non-freezing liquid which mixes with water and a non-evaporating liquid which floats on top of water, preventing most of its evaporation. A movable scale is removably attached to the outer surface of the collection vessel. The scale can be slid vertically along the collection vessel and enables the measurement of precipitation during an interim period of time.

BRIEF DESCRIPTION OF THE DRAWINGS

FIG. 2 is a front elevational view of the collection vessel;

FIG. 3 is a rear elevational view of the collection vessel with the movable scale attached thereto;

FIG. 4 is a top plan view of the collection vessel with the movable scale attached thereto;

FIG. 5 is a front view of the evaporation vessel;

FIG. 6 is a sectional view of the evaporation vessel taken along the line 6—6 of FIG. 5;

FIG. 7 is an enlarged fragmentary rear view of the collection vessel;

FIG. 8 is an enlarged fragmentary rear view of the collection vessel; and

FIG. 9 is a front view of the heater;

DETAILED DESCRIPTION OF THE PREFERRED EMBODIMENTS

Figure 1:
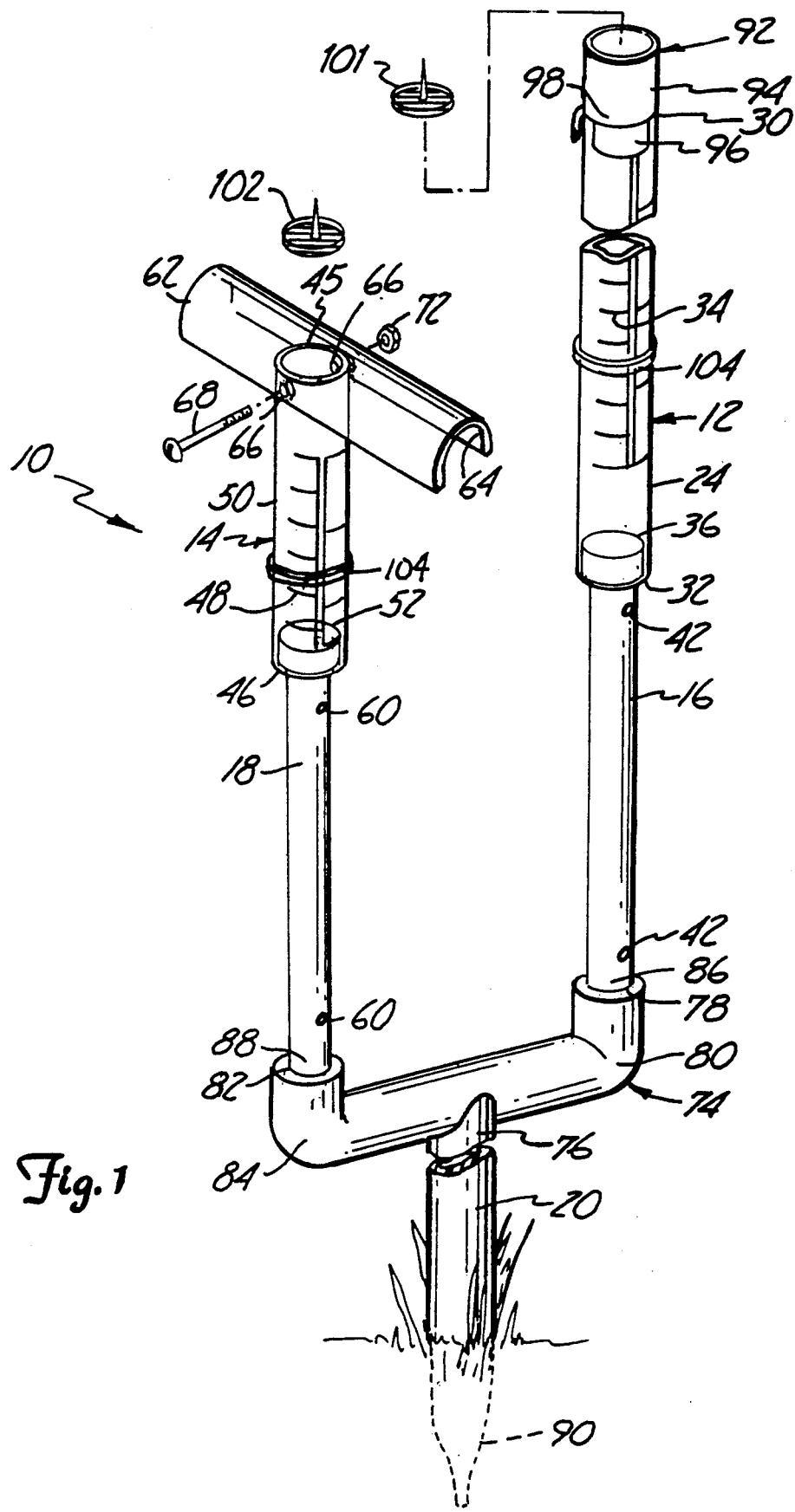
FIG. 1 is a perspective view of the rain gauge of the present invention inserted into the ground.

The rain gauge 10 of the present invention is shown inserted into the ground in FIG. 1. The rain gauge 10 comprises a collection vessel 12, an evaporation vessel 14, a collection vessel support 16 attached to the collection vessel 12, an evaporation vessel support 18 attached to the evaporation vessel 14 and a support post 20. A movable scale 22 is releasably attached to an outer surface 24 of the collection vessel 12. A non-freezing liquid 26, such as propylene glycol antifreeze, and a non-evaporating liquid 28, such as liquid silicone, are placed in both the collection vessel 12 and the evaporation vessel 14.

The collection vessel 12, shown in FIG. 2, is fabricated from a hard, clear plastic and has the general shape of a hollow cylinder open at both a first end 30 and a second end 32. A series of evenly spaced, horizontal markings 34 are located on the outer surface 24 of the collection vessel 12 for visually indicating the water level therein. The markings 34 are scaled in both inches and centimeters starting at zero near the second end 32 of the collection vessel 12 and ending near the first end 30 of the collection vessel 12.

A collection vessel plug 36 having the general shape of a cylinder is inserted into the second end 32 of the collection vessel 12 so that a first end 38 of the collection vessel plug 36 is flush with the second end 32 of the collection vessel 12. The collection vessel plug 36 is epoxied in place to form a watertight seal with the collection vessel 12. The first end 38 of the collection vessel plug 36 has a circular recess 40 therein into which a first end 41 of the collection vessel support 16 can be removably inserted. The collection vessel support 16 has the general shape of a tube and has two mounting holes 42 drilled therethrough.

The movable scale 22, shown in FIGS. 3 and 4, is fabricated from a hard, clear plastic and has the general shape of a half-tube. The movable scale 22 is slidably attached to the outer surface 24 of the collection vessel 12 and has a series of evenly spaced, horizontal markings 43 thereon. The markings are scaled in both inches and centimeters and begin at zero near a first end 44 of the movable scale 22. The movable scale 22 can be slid along the collection vessel 12 until the zero marking is at the water level. After the desired time period has passed, the new water level can be read from the movable scale 22.

The evaporation vessel 14, shown in FIG. 5, is fabricated from a hard, clear plastic and has the general shape of a hollow cylinder open at both a first end 45 and a second end 46. A series of evenly spaced, horizontal markings 48 are located on an outer surface 50 of the evaporation vessel 14 for visually indicating the water level therein. The markings 48 are scaled in both inches and centimeters, starting at zero near the first end 45 of the evaporation vessel 14 and ending near the second end 46 of the evaporation vessel 14.

An evaporation vessel plug 52 having the general shape of a cylinder is inserted into the second end 46 of the evaporation vessel 14 so that a first end 54 of the evaporation vessel plug 52 is flush with the second end 46 of the evaporation vessel 14. The evaporation vessel plug 52 is epoxied in place to form a watertight seal with the evaporation vessel 14. The first end 54 of the evaporation vessel plug 52 has a circular recess 56 therein into which a first end 58 of the evaporation vessel support 18 can be removably inserted. The evaporation vessel support 18 has the general shape of a tube and has two mounting holes 60 drilled therethrough.

An evaporation cover 62 having the general shape of a half-tube is pivotally attached to the first end 45 of the evaporation vessel 14 such that an inner surface 64 of the evaporation cover 62 faces the first end 45 of the evaporation vessel 14. The evaporation cover 62 prevents precipitation from entering the evaporation vessel 14 but allows the evaporation of water in the evaporation vessel 14. The evaporation cover 62 has two cover holes 66 therethrough and a cover screw 68 is inserted through the cover holes 66 and through a pair of corresponding vessel holes 70 in the evaporation vessel 14. The cover screw 68 is secured with a nut 72 to securely hold the evaporation cover 62 over the first end 45 of the evaporation vessel 14. The evaporation cover 62 is able to pivot about the screw 6S to a position exposing the first end 45 of the evaporation vessel 14 enabling the user to place water in the vessel 14.

One and one-quarter inches of the non-freezing liquid 26 is contained in the collection vessel 12, as shown in FIG. 7. The non-freezing liquid 26 mixes with the collected precipitation in the collection vessel 12, as shown in FIG. 8, to prevent the water from freezing n cold weather. The evaporation vessel 14 contains a mixture of the non-freezing liquid 26 and water in sufficient quantity to bring the mixture level to the zero marking at the first end 45 of the evaporation vessel 14.

One quarter inch of the non-evaporating liquid 28 is contained in both the collection vessel 12 and the evaporation vessel 14. The non-evaporating liquid 28 does not mix with either the non-freezing liquid 26 or water and floats on top of the non-freezing liquid 26 and any water in both the collection vessel 12 and the evaporation vessel 14. The non-evaporating liquid 28 substantially reduces the rate of evaporation of the water beneath it in the collection vessel 12. The rate of evaporation will depend upon the characteristics of the non-evaporating liquid 28 used. The use of the non-evaporating liquid 28 allows, over a period of time, the precipitation in the collection vessel 12 to more accurately reflect the amount of precipitation or moisture that is usable by crops or other vegetation. For any evaporation of water from the collection vessel 12 that does occur, the same amount of water will evaporate from the evaporation vessel 14. Therefore, the amount of collected water that evaporates from the collection vessel 12 can be determined by visually examining the water level in the evaporation vessel 14. This allows a more accurate determination of the actual amount of precipitation.

The support post 20 is fabricated from a hard, lightweight plastic and has the general shape of a tube. A support connector 74 is attached to a first end 76 of the support post 20 and has a circular first connector recess 78 in a first branch 80 and a circular second connector recess 82 in a second branch 84. A second end 86 of the collection vessel support 16 is removably inserted into the first connector recess 78 and a second end 88 of the evaporation vessel support 18 is removably inserted into the second connector recess 82. The diameter of a second end 90 of the support post 20 narrows so that the support post 20 can be easily inserted into the ground.

The collection vessel support 16 and the evaporation vessel support 18 can be removed from the first connector recess 78 and the second connector recess 82, respectively. The vessel supports 16,18 and therefore the vessels 12,14 can then be attached to a separate object such as a wooden post by inserting a screw through each of the mounting holes 42,60 and into the object. In addition, once separated from the support connector 74, the vessel supports 16,18 can be attached to an ordinary fence post through the use of heavy-duty tape or other known methods. Both the collection vessel 12 and the evaporation vessel 14 can be used separately as well.

A heater 92, shown in FIG. 6, is removably attached to the first end 30 of the collection vessel 12. The heater 92 comprises a first section 94, a second section 96 integral with a lower end 98 of the first section 94 and a heating element 100. The first section 94 has the general shape of a tube having inner and outer diameters equal to those of the collection vessel 12. The first section 94 will therefore collect the same amount of precipitation as the collection vessel 12. The second section 96 also has the general shape of a tube and has an outer diameter equal to the inner diameter of the collection vessel 12.

The second section 96 of the heater 92 is inserted into the first end 30 of the collection vessel 12 until the lower end 98 of the first section 94 comes into contact with the first end 30 of the collection vessel 12, forming a watertight seal. The heating element 100 is attached to the lower end 98 of the first section 94 and melts any frozen precipitation entering the first section 94 of the heater 92. The melted precipitation can then pass in liquid form through the second section 96 and into the collection vessel 12.

A first removable screen 101 is inserted in the first end 30 of the collection vessel 12 and a second removable screen 102 is inserted in the first end 45 of the evaporation vessel 14. The first and second removable screens 101,102 prevent insects and debris from entering the collection vessel 12 and the evaporation vessel 14, respectively. When precipitation contacts the first removable screen 101, it may cause a splash. Therefore, the first removable screen 101 is pushed far enough into the collection vessel 12 to prevent the splash from falling outside of the collection vessel 12.

A plurality of marking clips 104 can be removably attached to the outer surface 24 of the collection vessel 12 and the outer surface 50 of the evaporation vessel 14. Each marking clip 104 has the general shape of a half ring and can be used to mark a particular water level.

Although the present invention has been described with reference to preferred embodiments, workers skilled in the art will recognize that changes may be made in form and detail without departing from the spirit and scope of the invention.

What is claimed is:

1. An apparatus for collecting and accurately measuring precipitation, the apparatus comprising:
   a collection vessel open at a first end for collecting precipitation;

an evaporation vessel open at a first end for measuring the evaporation of collected precipitation;

cover means attached to the evaporation vessel for preventing precipitation from entering the evaporation vessel; and support means for supporting the collection vessel and the evaporation vessel.

2. The apparatus according to claim 1 wherein the first end of the collection vessel faces upward and the outer surface of the collection vessel has a series of evenly spaced horizontal marks thereon.

3. The apparatus according to claim 1 wherein the first end of the evaporation vessel faces upward and an outer surface of the evaporation vessel has a series of evenly spaced horizontal marks thereon.

4. The apparatus according to claim 1 and a movable scale slidably attached to an outer surface of the collection vessel.

5. The apparatus according to claim 1 wherein the support means comprises a first support removably attached to a second end of the collection vessel, a second support removably attached to a second end of the evaporation vessel, a support post, and a support connector attached to the support post and capable of supporting both the first support and the second support.

6. The apparatus according to claim 1 wherein a non-freezing liquid is placed in the collection vessel and in the evaporation vessel to prevent water contained therein from freezing.

7. The apparatus according to claim 6 wherein the non-freezing liquid comprises antifreeze.

8. The apparatus according to claim 1 wherein a non-evaporating liquid is placed in the collection vessel and in the evaporation vessel to substantially prevent water contained therein from evaporating.

9. The apparatus according to claim 8 wherein the non-evaporating liquid comprises liquid silicone.

10. The apparatus according to claim 1 wherein a heater is removably inserted into the first end of the collection vessel for melting frozen precipitation.

11. The apparatus according to claim 1 wherein the cover means comprises an evaporation cover which covers the first end of the evaporation vessel in a manner which prevents precipitation from entering the evaporation vessel while allowing air to enter the evaporation vessel.

12. The apparatus according to claim 1 and a first removable screen at the first end of the collection vessel to prevent insects and debris from entering the collection vessel.

13. The apparatus according to claim 12 and a second removable screen at the first end of the evaporation vessel to prevent insects and debris from entering the evaporation vessel.

14. A moisture gauge for collecting and measuring precipitation usable by crops and other vegetation, and for measuring the evaporation of collected precipitation to allow an accurate determination of the actual amount of precipitation, the moisture gauge comprising:

a collection vessel open at a first end for collecting precipitation;

an evaporation vessel open at a first end for measuring the evaporation of collected precipitation;

cover means attached to the evaporation vessel for preventing precipitation from entering the evaporation vessel; and support means for supporting the collection vessel and the evaporation vessel.

15. The moisture gauge according to claim 14 and a movable scale removably attached to an outer surface of the collection vessel.

16. The moisture gauge according to claim 14 and a non-evaporating liquid placed in the collection vessel and in the evaporation vessel to partially prevent water contained therein from evaporating.

17. The moisture gauge according to claim 16 wherein the non-evaporating liquid comprises liquid silicone.

18. The moisture gauge according to claim 17 wherein the liquid silicon is a type 200 fluid with 50 centistokes.

* * * * *

UNITED STATES PATENT AND TRADEMARK OFFICE
CERTIFICATE OF CORRECTION

PATENT NO. : 5,284,052
DATED : February 8, 1994
INVENTOR(S) : GLEN F. THOMPSON It is certified that error appears in the above-identified patent and that said Letters Patent is hereby corrected as shown below:

Col. 4, line 68, after "precipitation;", insert --means for indicating a level of liquid in each of the collection and evaporation vessels relative to a reference;--

Col. 5, line 7, after "vessel", insert --adjacent to each other--

Col. 5, line 16, delete "and", insert --wherein the means for indicating includes--

Col. 6, line 23, after "precipitation;", insert --scale means for indicating the level of liquid in each of the collection and evaporation vessels relative to a reference;--

Col. 6, line 29, delete "and", insert --wherein the scale means for indicating includes--

Signed and Sealed this

Nineteenth Day of July, 1994

*Attest:*

BRUCE LEHMAN

*Attesting Officer*  *Commissioner of Patents and Trademarks*